US008766165B1

(12) United States Patent
Zhovnirovsky et al.

(10) Patent No.: US 8,766,165 B1
(45) Date of Patent: Jul. 1, 2014

(54) PATTERN-BASED OPTICAL LENS TESTING APPARATUS HAVING A MODULE COMPARING A VIEWED IMAGE REPRESENTATION TO A COPY OF TARGET PATTERN AND METHOD FOR USING THE SAME

(75) Inventors: Igor Zhovnirovsky, Newton, MA (US); Subhash Roy, Lexington, MA (US)

(73) Assignees: Applied Micro Circuits Corporation, San Diego, CA (US); Volex PLC, London (GB)

( * ) Notice: Subject to any disclaimer, the term of this patent is extended or adjusted under 35 U.S.C. 154(b) by 382 days.

(21) Appl. No.: 13/031,196

(22) Filed: Feb. 19, 2011

Related U.S. Application Data

(63) Continuation-in-part of application No. 12/900,401, filed on Oct. 7, 2010, now Pat. No. 8,057,106, which is a continuation-in-part of application No. 12/862,614, filed on Aug. 24, 2010, now Pat. No. 8,061,904, which is a continuation-in-part of application No. 12/793,513, filed on Jun. 3, 2010, which is a continuation-in-part of application No. 12/784,849, filed on May 21, 2010, now Pat. No. 8,109,676, which is a continuation-in-part of application No. 12/756,087, filed on Apr. 7, 2010, now Pat. No. 8,109,678, which is a continuation-in-part of application No. 12/652,705, filed on Jan. 5, 2010, now Pat. No. 8,109,675, which is a continuation-in-part of application No. 12/581,799, filed on Oct. 19, 2009, now Pat. No. 8,113,721, which is a continuation-in-part of application No. 12/483,616, filed on Jun. 12, 2009.

(51) Int. Cl.
*H01J 3/14* (2006.01)

(52) U.S. Cl.
USPC .............................. 250/216; 250/208.1

(58) Field of Classification Search
USPC ......... 250/208.1, 239, 216; 356/239.1, 124.5, 356/124; 359/394, 368, 379, 382
See application file for complete search history.

(56) References Cited

U.S. PATENT DOCUMENTS

| | | | |
|---|---|---|---|
| 3,930,732 A * | 1/1976 | Holly | ............... 356/124.5 |
| 4,736,100 A | 4/1988 | Vastagh | |
| 6,896,421 B2 | 5/2005 | Monson et al. | |
| 6,910,812 B2 | 6/2005 | Pommer et al. | |
| 2003/0048448 A1 | 3/2003 | Fleming et al. | |
| 2003/0234924 A1 | 12/2003 | Ono | |
| 2004/0165836 A1 | 8/2004 | Monson et al. | |
| 2005/0184227 A1 | 8/2005 | Kuu et al. | |
| 2006/0221345 A1 | 10/2006 | Hiiro | |
| 2010/0014854 A1 | 1/2010 | Healey et al. | |
| 2010/0165329 A1 | 7/2010 | Lee et al. | |

* cited by examiner

*Primary Examiner* — Que T Le
(74) *Attorney, Agent, or Firm* — Baker & Hostetler LLP

(57) ABSTRACT

A pattern method is provided for testing an optical lens. The method provides a lens for test, including a first lens surface with a focal plane in object space and a second lens surface with a focal plane in image space. Also provided is a pattern test fixture including an imaging device and a target pattern. The lens is positioned so that the imaging device is located outside the object space focal plane and the target pattern located is outside the image space focal plane. The imaging device, such as a microscope, magnification device, human eye, or camera, is used to view the target pattern. A viewed image representation of the target pattern is received in the imaging device and compared to the target pattern. More typically, the viewed image representation is compared to a target pattern copy.

25 Claims, 7 Drawing Sheets

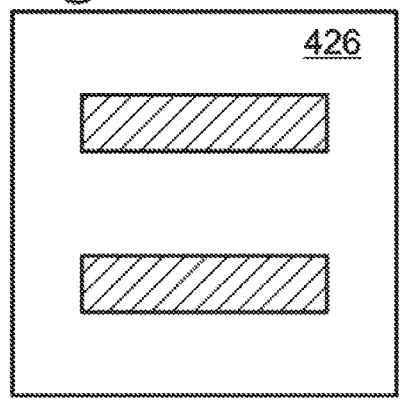
Fig. 5A — TARGET COPY
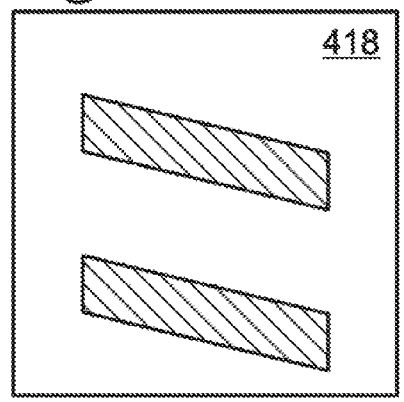
Fig. 5B — VIEWED IMAGE REPRESENTATION
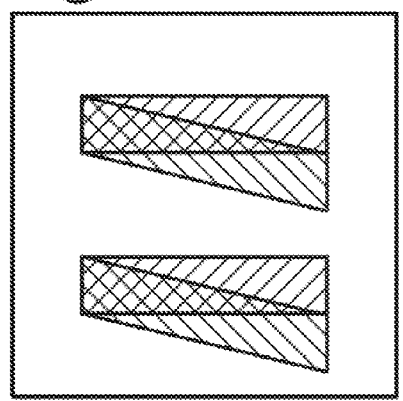
Fig. 5C — OVERLAY
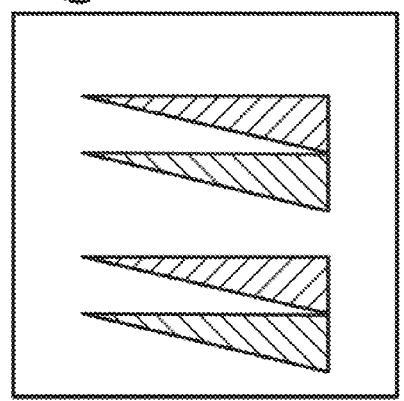
Fig. 5D — SUBTRACTION PATTERN
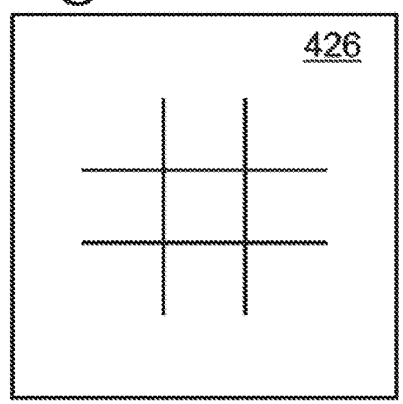
Fig. 6A — TARGET COPY
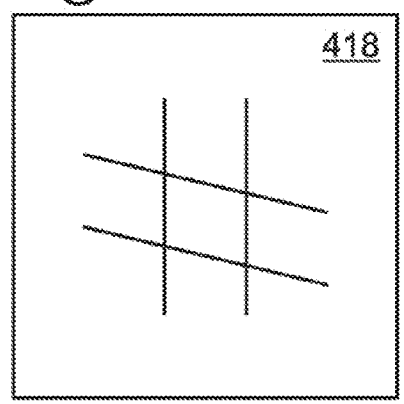
Fig. 6B — VIEWED IMAGE REPRESENTATION

ADDITION PATTERN

TARGET PATTERN

TARGET COPY

VIEWED IMAGE REPRESENTATION

TARGET COPY

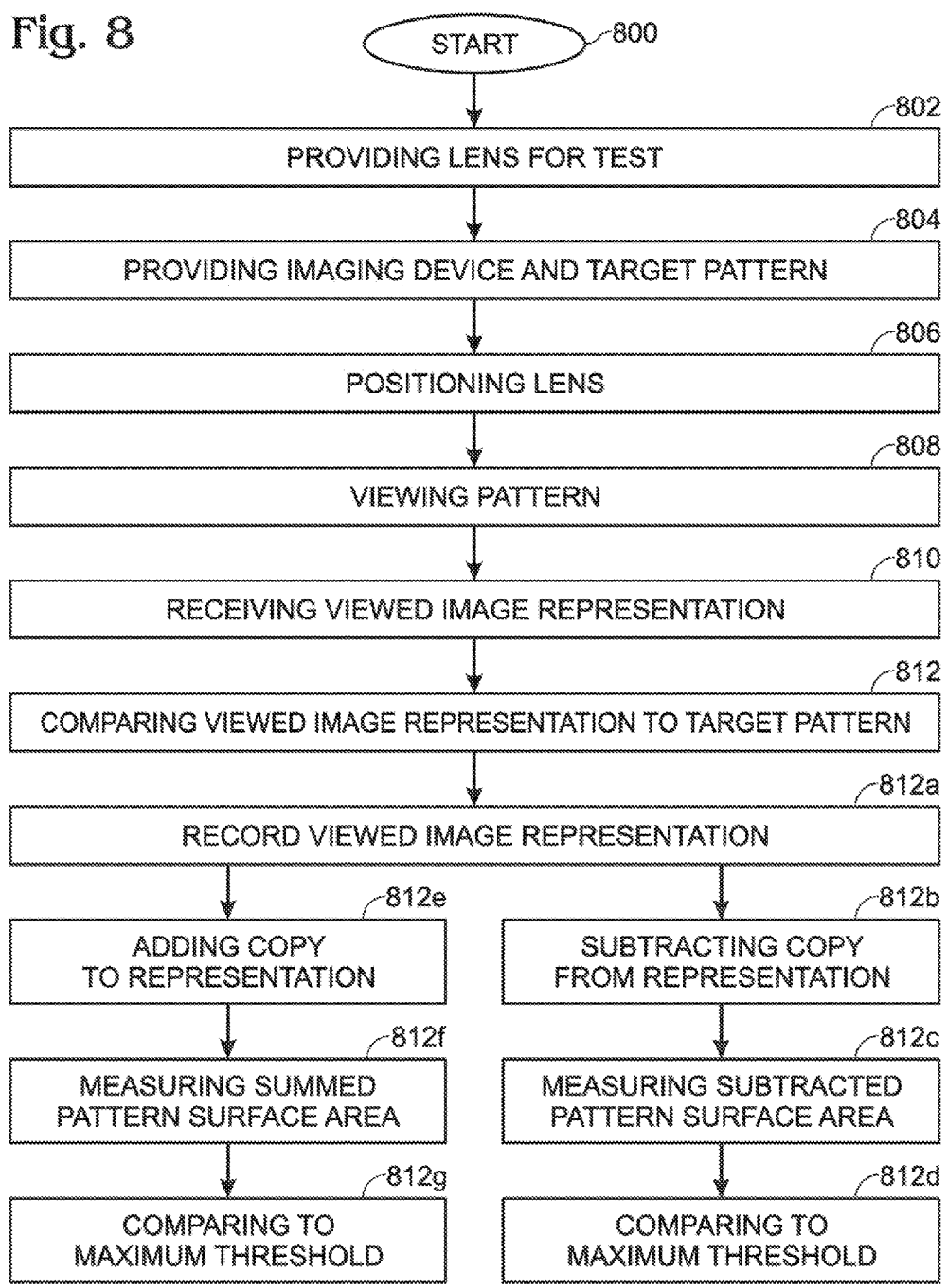

PATTERN-BASED OPTICAL LENS TESTING APPARATUS HAVING A MODULE COMPARING A VIEWED IMAGE REPRESENTATION TO A COPY OF TARGET PATTERN AND METHOD FOR USING THE SAME

RELATED APPLICATIONS

This application is a Continuation-in-Part of a pending application entitled, FIBER OPTIC CONNECTOR MICROLENS WITH FOCAL PLANE ALIGNING FIBER TRAP, invented by Reid Greenberg et al., Ser. No. 12/900,401, filed Oct. 7, 2011;

which is a Continuation-in-Part of a pending application entitled, FIBER OPTIC CONNECTOR MICROLENS WITH SELF-ALIGNING OPTICAL FIBER. CAVITY, invented by Igor Zhovnirovsky et al., Ser. No. 12/862,614, filed Aug. 24, 2010;

which is a Continuation-in-Part of a pending application entitled, FIBER OPTIC JACK WITH HIGH INTERFACE MISMATCH TOLERANCE, invented by Igor Zhovnirovsky et al., Ser. No. 12/793,513, filed Jun. 3, 2010;

which is a Continuation-in-Part of a pending application entitled, FIBER OPTIC CABLE WITH HIGH INTERFACE MISMATCH TOLERANCE, invented by Igor Zhovnirovsky et al., Serial No. 12/784,849, filed May 21, 2010;

which is a Continuation-in-Part of a pending application entitled, PUNCH-DOWN FIBER OPTIC CABLE TERMINATION, invented by Igor Zhovnirovsky et al., Ser. No. 12/756,087, filed Apr. 7, 2010:

which is a Continuation-in-Part of a pending application entitled, CONNECTOR JACK PROCESSING BACKCAP, invented by Igor Zhovnirovsky et al., Ser. No. 12/652,705, filed Jan. 5, 2010:

which is a Continuation-in-Part of a pending application entitled, OFF-AXIS MISALIGNMENT COMPENSATING FIBER OPTIC CABLE INTERFACE, invented by Igor Zhovnirovsky et al., Serial No. 12/581,799, filed Oct. 19, 2009;

which is a Continuation-in-Part of a pending application entitled, FIBER OPTIC CABLE INTERFACE, invented by Igor Zhovnirovsky et al., Ser. No. 12/483,616, filed Jun. 12, 2009. All the above-referenced applications are incorporated herein by reference.

BACKGROUND OF THE INVENTION

1. Field of the Invention

This invention generally relates to optical cables and, more particularly, to a method and fixture for testing fiber optical plug/jack connector microlenses.

2. Description of the Related Art

Conventionally, the fiber endfaces (optical interfaces) of two optical fiber connectors are pressed together, resulting in a direct glass to glass or plastic to plastic, contact. The avoidance of glass-to-air or plastic-to-air interfaces is critical, as an air interface results in higher connector losses. However, the tight tolerances needed to eliminate an air interface make these connectors relatively expensive to manufacture.

FIG. 1 illustrate the assembly of the components of a Transmission Optical SubAssembly (TOSA) to form a light transmitting/receiving structure (prior art). The TOSA 10 of FIG. 1A includes an optical package 20, a cylindrical holding barrel 26 and a ferrule 30. The optical package 20 has an optical or optoelectronic component 21.

FIG. 2 is a partial cross-sectional view of a TOSA optical cable plug with lens (prior art). The plug 100 is made from a plastic housing 102 with a bored ferrule 106 to secure an optical fiber 108. The plug 100 also includes a plastic lens 110, manufactured as a subassembly, integrated into the plug. The lens 110 has a curved surface to create a focal plane where the plug mates with a jack. The advantage of using a lens includes the ability to focus light on a point, such as a photodiode or optical fiber core face, while transceiving light in a collimated beam between connectors. The gain resulting from the use of a lens permits a low loss air gap to be formed between the plug and a connecting jack. However, the focusing of light on a fiber core face requires that the fiber core and microlens be properly aligned. In addition to the expense of manufacturing a 2-part plug, the plug must be made to relatively tight tolerances, so that the lens focal plane aligns with the jack, which also increases the cost of the plug.

In conventional manufacturing processes, components of a light transmitting/receiving structure have inherent flaws that frequently cause deviations in the optical signal transmission path of the structure after being assembled. The light transmitting/receiving structure thus produced is of poor quality. With respect to the TOSA of FIG. 1, possible causes of deviations in the optical signal transmission path include misalignment of the optical axis of the optical or optoelectronic component 21, improper location of a focusing element 110 (FIG. 2), loose or slack connection between the optical package 20 and the holding barrel 26, loose connection between the holding barrel 26 and the ferrule 30, failure to firmly grasp the optical fiber that is inserted into the axial hole, inadequate core concentricity of the fiber stop 32, and failure of the ferrule 30 to firmly grasp the fiber stop 32.

One method of testing an optical cable involves connecting the cable between an optical transmitter and receiving circuitry, and measuring optical communication errors. As noted in US 2005/0184227 (Kuu et al.), another method involves clamping a TOSA into a test jig and measuring optical signal strength.

In the field of optics, the "sharpness" of a lens is typically a primary concern. Spherical aberration affects the whole image captured by a lens, while astigmatism and coma mostly affect the edges and corners. The tests for these types of problems can be extensive. For example, the USAF 1951 lens test chart and its variants are a standard unsuited for computer analysis because of its fragmented arrangement, and poorly suited for visually estimating MTF (Modulation Transfer Function), as a person must strain their eyes to find highest resolution at which bars can be distinguished. Improved versions, such as the Koren test chart, permit a tester to state that at a given f-stop, the center or corner of this lens has 50% MTF at roughly x lp/mm and 10% MTF at y lp/mm. These numbers are well standardized and closely related to perceived image quality and resolution. However, a complicated lens sharpness test is not an efficient means of determining lens alignment, especially if sharpness is not a critical issue.

It would be advantageous if the lens alignment of an optical connector plug or jack could be easily tested.

SUMMARY OF THE INVENTION

Accordingly, a pattern method is provided for testing an optical lens. The method provides a lens for test, including a first lens surface with a focal plane in object space and a second lens surface with a focal plane in image space. Also provided is a pattern test fixture including an imaging device and a target pattern. The lens is positioned so that the imaging device is located outside the object space focal plane and the target pattern located is outside the image space focal plane. The imaging device, such as a microscope, magnification device, human eye, or camera, is used to view the target pattern. A viewed image representation of the target pattern is received in the imaging device and compared to the target pattern.

More typically, the viewed image representation is compared to a target pattern copy. For example, the viewed image representation may be recorded, and the target pattern copy is subtracted from the recorded image representation. In one aspect, the subtraction of the target pattern copy from the recorded image representation creates a subtracted pattern. Ideally, the patterns should be self-canceling. Assuming that the patterns are a combination of lines and spaces between lines, the surface area subtracted pattern of either the non-canceled lines or non-canceled spaces is compared to a maximum threshold.

Additional details of the above-described method, and an optical lens test fixture, are provided below.

BRIEF DESCRIPTION OF THE DRAWINGS

FIGS. 5A through 5D depict steps in a subtraction pattern analysis.

FIGS. 6A through 6C depict steps in an addition pattern analysis.

FIG. 8 is a flowchart illustrating a pattern method for testing an optical lens.

DETAILED DESCRIPTION

Figure 1:
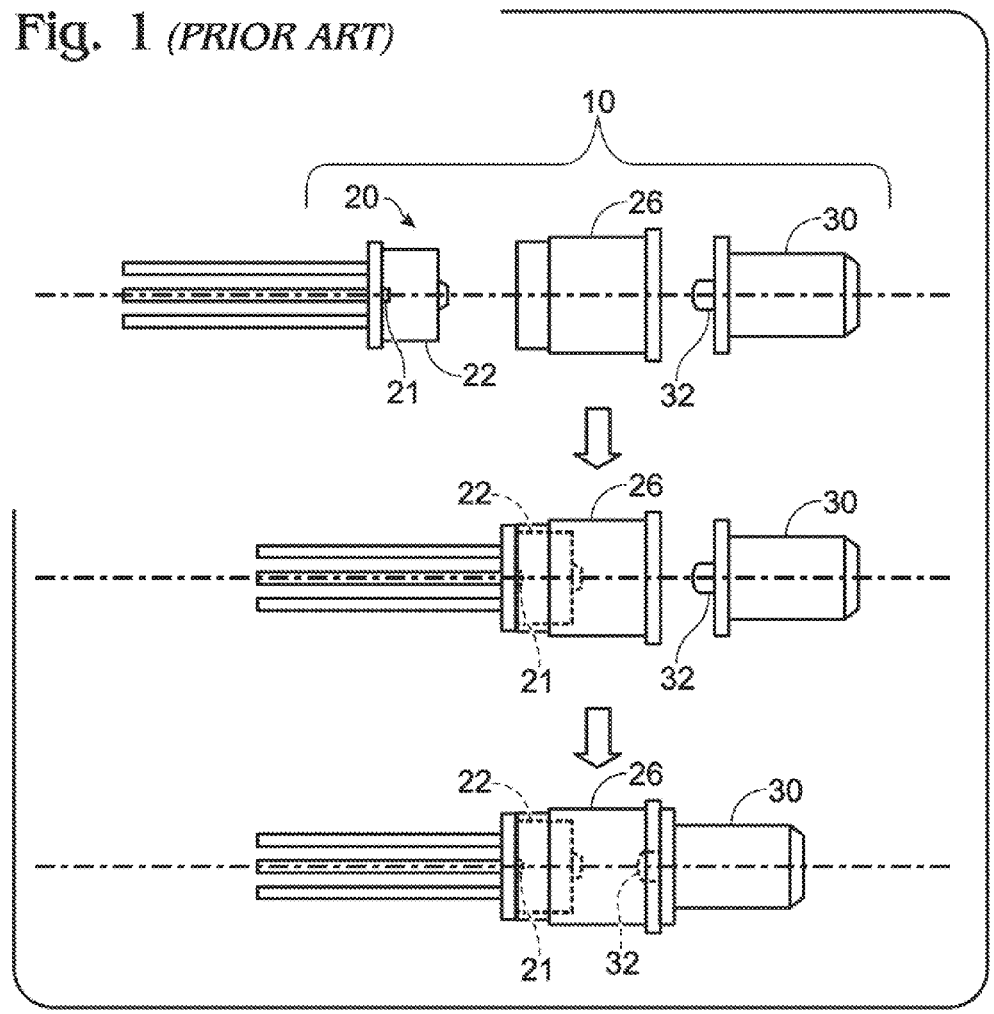
FIG. 1 illustrates the assembly of the components of a Transmission Optical SubAssembly (TOSA) to form a light transmitting/receiving structure (prior art).
Figure 2:
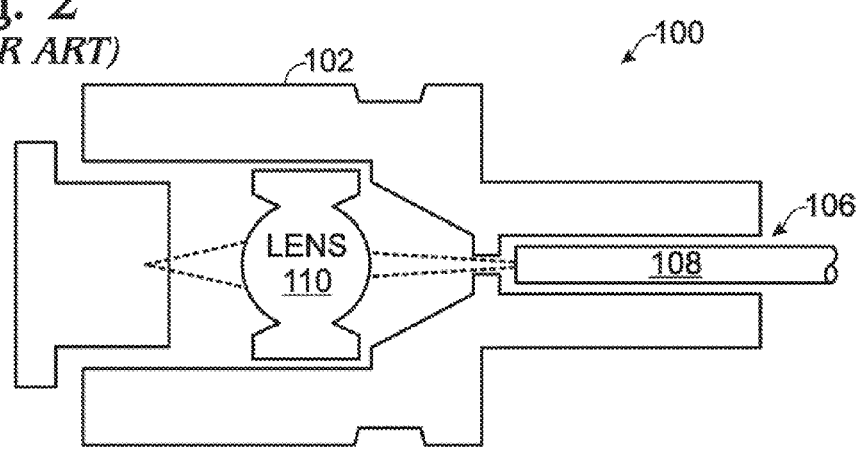
FIG. 2 is a partial cross-sectional view of a TOSA optical cable plug with lens (prior art).
Figure 3:
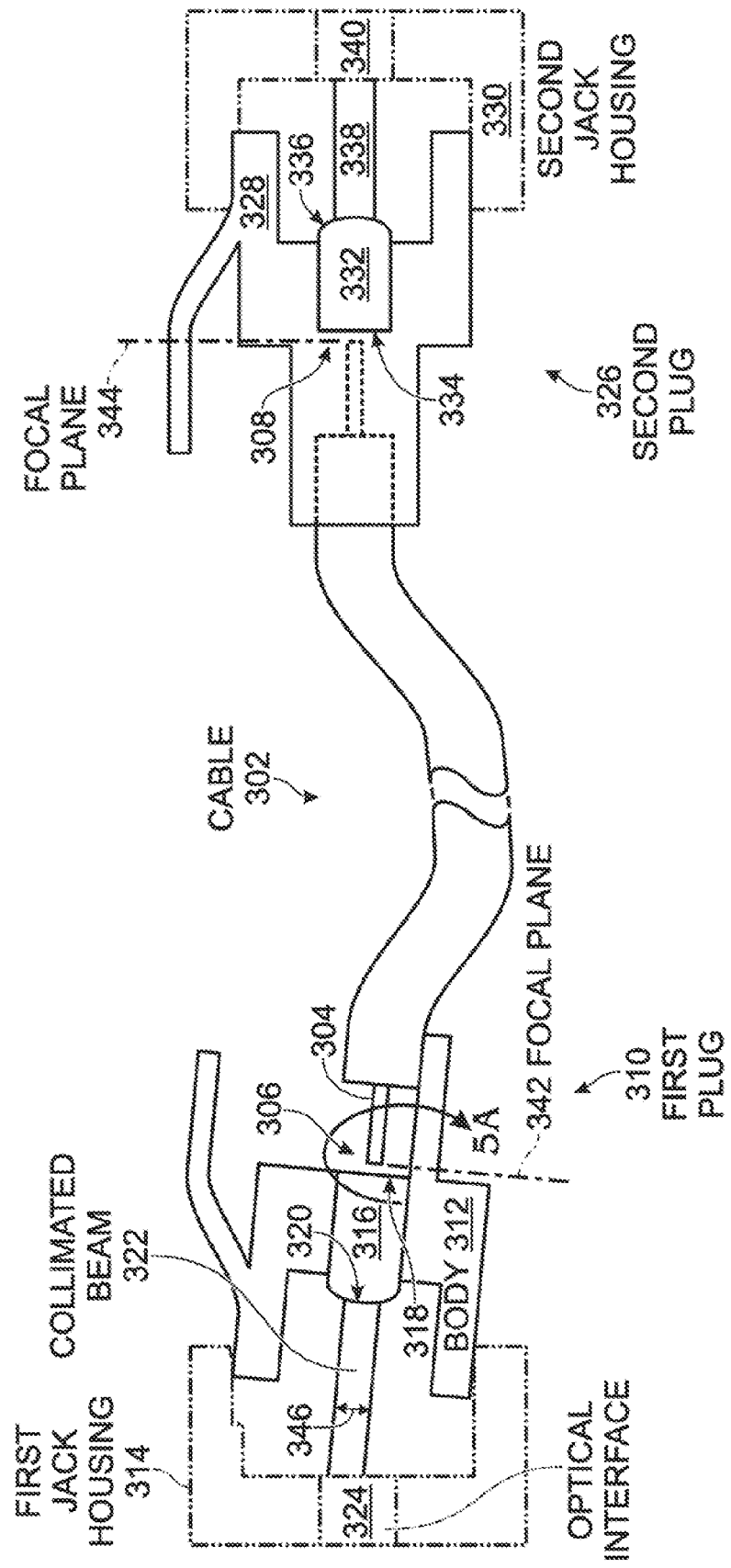
FIG. 3 is a diagram depicting an exemplary fiber optic cable.

FIG. 3 is a diagram depicting an exemplary fiber optic cable. The fiber optic cable 300 comprises a cable section 302 including at least one length of fiber optic line or core 304 having a first end 306 and a second end 308. A first plug 310 includes a mechanical body 312 shaped to selectively engage and disengage a first jack housing 314 (shown in phantom), and a microlens 316. As defined herein, the plug is mechanically engaged with the jack when the plug is fully inserted into the jack. In some aspects, a locking mechanism is enabled when the plug and jack are mechanically engaged. An RJ-45 connector is one example of such a locking type mechanical engagement (as shown). In other aspects, mechanical engagement is obtained with a pressure or friction type fit. A universal serial bus (USB) connector, microUSB, HDMI, and DisplayPort are some examples of a pressure/friction type of mechanical engagement. Alternately stated, a plug and jack are mechanically engaged when they are mated sufficiently to perform their intended electrical or optical functions.

The first plug microlens 316 may have a planar surface 318 to engage the fiber optic line first end 306 and a convex surface 320 to transceive light in a first collimated beam 322 with a first jack optical interface 324. However, other lens surface types are possible. Likewise, a second plug 326 includes a mechanical body 328 shaped to selectively engage and disengage a second jack housing 330 (shown in phantom), and a microlens 332. The second plug microlens 332 has a planar surface 334 to engage the fiber optic line second end 308 and a convex surface 336 to transceive light in a second collimated beam 338 with a second jack optical interface 340.

A collimated beam is light whose rays are parallel, and therefore the beam spreads slowly as it propagates. Laser light from gas or crystal lasers is naturally collimated because it is formed in an optical cavity between two mirrors, in addition to being coherent. However, diode lasers do not naturally emit collimated light, and therefore collimation into a beam requires a collimating lens. A perfect parabolic mirror will bring parallel rays to a focus at a single point. Conversely, a point source at the focus of a parabolic mirror will produce a beam of collimated light. Spherical mirrors are easier to make than parabolic mirrors and they are often used to produce approximately collimated light. Many types of lenses can also produce collimated light from point-like sources.

The fiber optic cable first end 306 is formed in a focal plane 342 of the first plug microlens 316, and the fiber optic cable second end 308 is formed in a focal plane 344 of the second plug microlens 332. In one aspect, the first and second plug microlenses 316/332 are made from a polycarbonate resin thermoplastic such as lexan or ultem, and have respective focal lengths 342 and 344 in the range of 2 to 4 mm. In one aspect, the first and second plug microlens 316 and 332 transceive the collimated beams with a beam diameter 346 in the range of 1.2 to 1.3 mm.

As used herein, a jack is the "female" connector and a plug is a mating "male" connector. Note, a portion of the first plug body has been cut away to show the fiber line 304. Although not explicitly shown in the figure, the jack housings may also incorporate a microlens. Such jack housing are described in the above-referenced parent applications.

Figure 4:
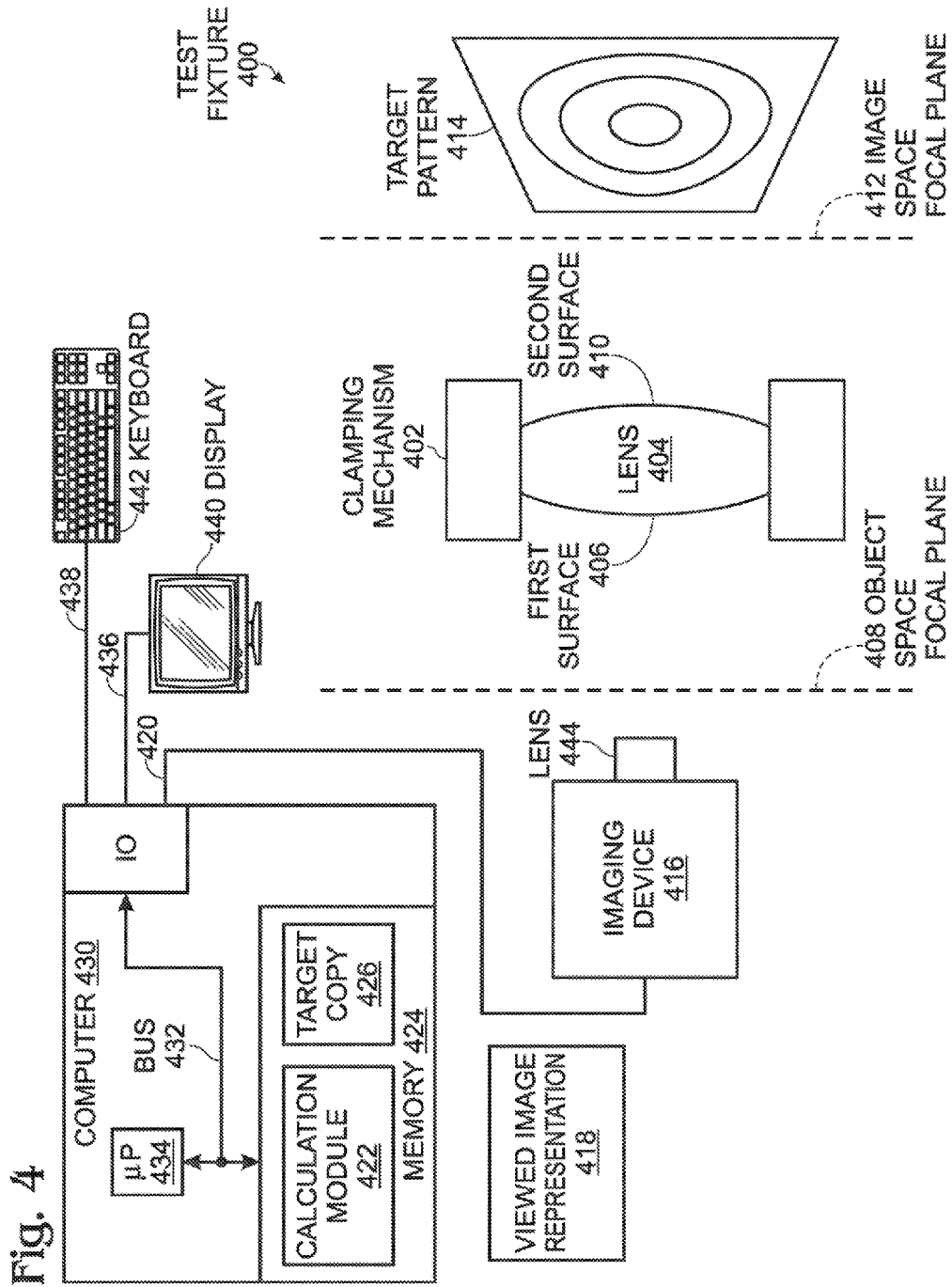
FIG. 4 is a diagram depicting an optical lens test fixture.

FIG. 4 is a diagram depicting an optical lens test fixture. The test fixture 400 comprises a lens clamping mechanism 402 to locate a lens 404 in a test position. The lens 404 includes a first lens surface 406 with a focal plane 408 in object space and a second lens surface 410 with a focal plane 412 in image space. A target pattern 414 is located outside the image space focal plane 412. An imaging device 416 is located outside the object space focal plane 408 to accept a viewed image representation 418 of the target pattern 414. The imaging device 416 may be a magnification instrument, a camera, or even a human eye.

A digital imaging device 416 will typically have an interface on line 420 to supply the viewed image representation 418. A calculation module 422 has an interface on line 420 to accept the viewed image representation, and a memory 424 including a target pattern copy 426. The calculation module 422 compares the viewed image representation 418 to the target pattern copy 426, and supplies an analysis of the comparison at an output. The output may an audio/visual cue, an electronic message on line 420 to another electronic device (not shown), a print-out, or a graphic display to name a few examples.

As used in this application, the term "module" and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

A computer device 430 required to support such a module (i.e. calculation module 422) typically employs a computer system with a bus 432 or other communication mechanism for communicating information, and a processor 434 coupled to the bus for processing information. The computer system may also includes a main memory, such as a random access memory (RAM) or other dynamic storage device, coupled to the bus for storing information and instructions to be executed by processor. These memories may also be referred to as a computer-readable medium 424. The execution of the sequences of instructions contained in a computer-readable medium may cause a processor 434 to perform some of the steps associated with position calculation. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The computing device interface 420 may be a local or network interface, or it may be more than one interface. The interface 420 may be a modem, an Ethernet card, or any other appropriate data communications device. The physical communication links may be optical, wired, or wireless.

The computing device 430 may further include appropriate input/output (IO) ports on lines 436 and 438 for user interface interconnection, respectively, with a display 440 and a keyboard 442. For example, the computer device may include a graphics subsystem to drive the output display. The output display 440 may include a cathode ray tube (CRT) display or liquid crystal display (LCD). The computing device 430 may further include a port for connection to a printer (not shown). The input control devices for such an implementation may include the keyboard for inputting alphanumeric and other key information. The input control devices on line 438 may further include a cursor control device (not shown), such as a mouse, a touchpad, a trackball, stylus, or cursor direction keys. The links to the peripherals on line 438 may be wired connections or use wireless communications.

In summary, the calculation module 422 may be enabled as a software application of sequential instructions stored in the memory 424 and executed by the processor 434. Alternately but not shown, the processor explorer module may be completely or partially enabled in hardware as a state machine type logic module (e.g., a field programmable gate array (FPGA)).

In one aspect, the calculation module 422 accepts the viewed image representation and measures the intensity. Alternatively, the calculation module is not required and the imaging device, enabled as an intensity measurement device, supplies the intensity measurement.

In another aspect, the calculation module 422 records the viewed image representation 418 (e.g., stores the representation in memory 424) and subtracts the target pattern copy 426 from the viewed image representation 418.

FIGS. 5A through 5D depict steps in a subtraction pattern analysis. In one aspect, the calculation module records the viewed image representation and subtracts the target pattern copy from the viewed image representation, creating a subtracted pattern. Assuming that a pattern of line and spaces (between lines) is used, the calculation module measures the surface area in the subtraction pattern of a region. The region can be either the opaque (dark) lines or the transparent (light) spaces between lines. The calculation module compares the measured surface area with a maximum threshold.

FIG. 5A shown an exemplary target pattern copy 426 and FIG. 5B shows an exemplary viewed image representation. FIG. 5C depicts an overlay of the target pattern copy and viewed image representation. FIG. 5D is the resultant subtraction pattern using the lines region. The overall area of the subtraction pattern lines are compared to a maximum surface area threshold. Ideally, the lines should cancel each other out, and the spaces around the lines should cancel each other out. Thus, an ideal subtraction pattern should measure a surface area of zero.

Although a simple pattern of two lines has been shown, it should be understood that the subtraction pattern comparison process can be applied to almost any type of shape or pattern.

Figure 6C:
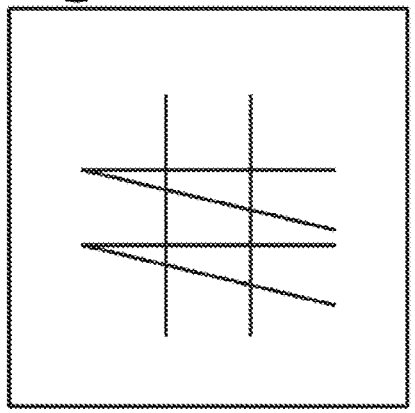

FIGS. 6A through 6C depict, steps in an addition pattern analysis. In this aspect the calculation module records the viewed image representation and adds the target pattern copy to the viewed image representation, creating an addition or summed pattern. Again assuming that the target pattern is a set of (opaque) lines and spaces, the calculation module measures the surface area in the summed pattern of either the lines region or spaces region, and compares the measured surface area with a maximum threshold.

FIG. 6A shown an exemplary target pattern copy 426 that is a grid pattern of opaque lines and spaces between the lines, and FIG. 6B shows an exemplary viewed image representation. FIG. 6C depicts the addition pattern of the target pattern copy and viewed image representation, using the (opaque) line regions. The overall area of the addition pattern lines is compared to a maximum surface area threshold. Ideally, the lines from the viewed image representation should overlay lines from the target copy, so that the surface area in the addition pattern is identical to the surface area of the view image representation (or target copy). Alternatively, the spaces from the viewed image representation should overlay the spaces from the target copy.

Figure 7A:
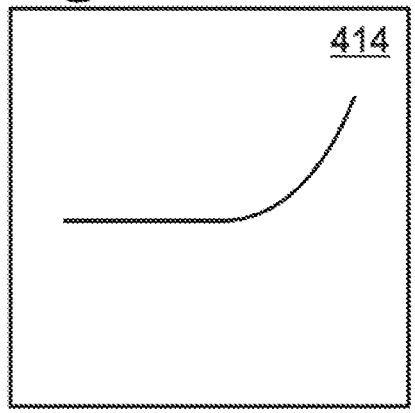
FIGS. 7A through 7D depict the analysis of a viewed image representation that undergoes a predetermined modification.
Figure 7B:
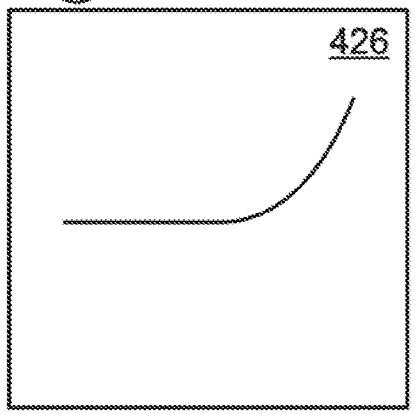
Figure 7C:
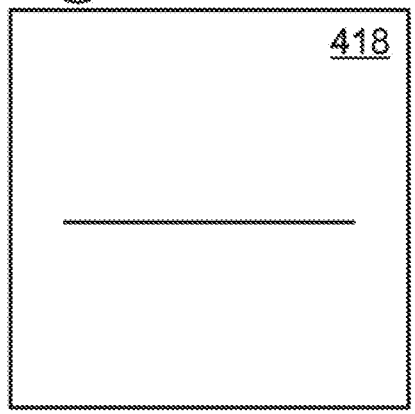
Figure 7D:
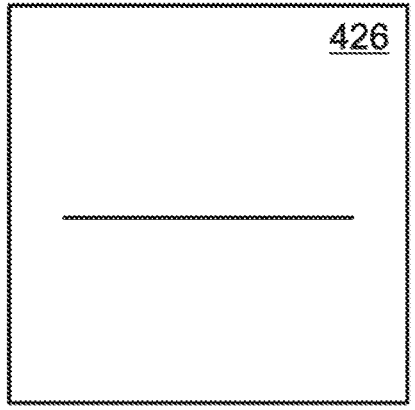

FIGS. 7A through 7D depict the analysis of a viewed image representation that undergoes a predetermined modification. In this aspect the calculation module compares a geometric feature in the target pattern copy to a predetermined modified geometric feature in the viewed image representation. FIG. 7A depicts an exemplary feature (e.g., a curved line) in the target pattern 414. Due to a predetermined optical transfer characteristic of the lens, under ideal conditions, the curved line is modified to be straight, as showed in the viewed image representation of FIG. 7C. For example, a third order curve in the target pattern copy 426 of FIG. 7B can be compared to a straight line in the viewed image representation 414 (FIG. 7C). Note: this type of analysis would require the calculation module to perform an internal transformation. Alternatively, a target copy can be made that incorporates the lens transfer function, as shown in FIG. 7D. As another alternative, an ideal target copy, incorporating the geometric modification, can be saved for comparison. Note: either addition or subtraction pattern analysis can be used to support this analysis.

Figure 9A:
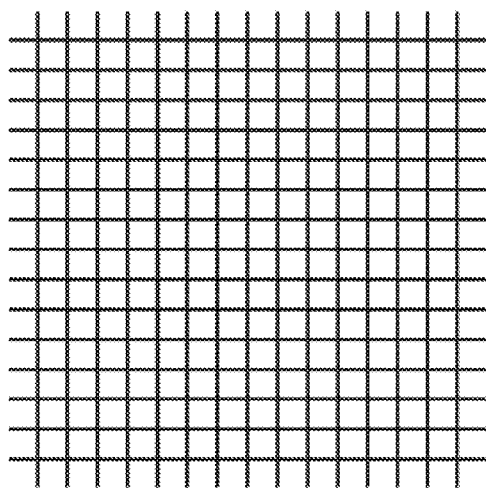
FIGS. 9A through 9D depict a second example of a viewed image representation that undergoes a predetermined modification.
Figure 9B:
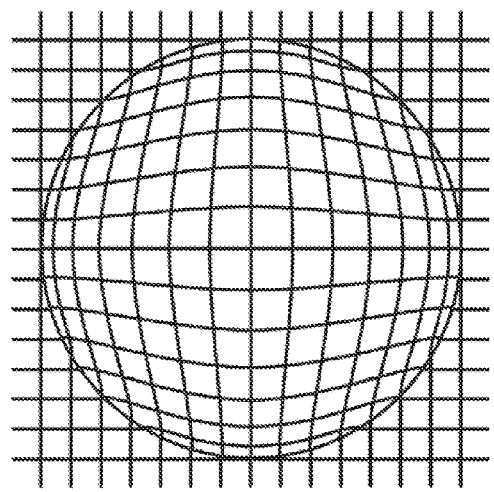
Figure 9C:
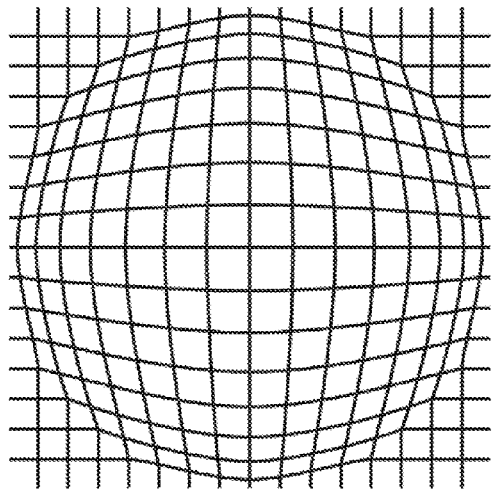
Figure 9D:
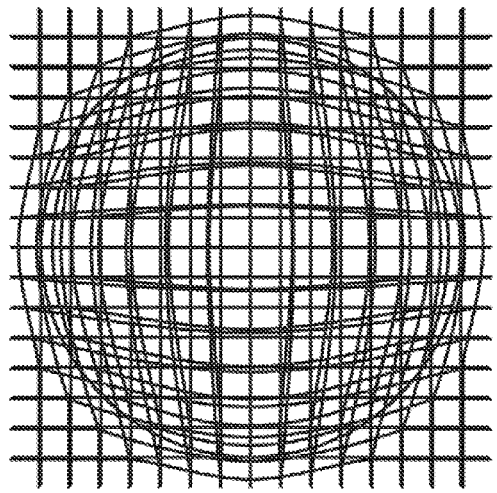

FIGS. 9A through 9D depict a second example of a viewed image representation that undergoes a predetermined modification. FIG. 9A depicts a grid target pattern. FIG. 9B depicts the target pattern of FIG. 9A as seen through a lens. Alternatively stated, FIG. 9B is an "ideal" viewed image representation or target copy. FIG. 9C depicts the target pattern of FIG. 9A as seen through a defective lens. FIG. 9D depicts the superposition if FIGS. 9B and 9C. From this point, the differences between the two patterns can be compared, for example, in an addition or subtraction pattern analysis.

In another aspect, the calculation module compares chromatic offsets in the viewed image representation to the target pattern copy.

Returning to FIG. 4, in a different aspect the imaging device 416 includes an optical transformation means, such as a lens 444, and supplies a viewed image representation 418 processed by the optical transformation means. Then, the calculation module 422 compares the target pattern copy 426, modified to account for the imaging device optical transformation, to the processed viewed image representation. Alternatively, the viewed image representation may undergo a digital transformation process. In one simple example, either the imaging device or calculation module may increase the size of the viewed image representation prior to comparison with the target copy.

FIG. 8 is a flowchart illustrating a pattern method for testing an optical lens. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 800.

Step 802 provides a lens for test, including a first lens surface with a focal plane in object space and a second lens surface with a focal plane in image space. Step 804 provides a pattern test fixture including an imaging device and a target pattern. The imaging device may be a magnification device or camera, and the target pattern may be a grid pattern of lines and spaces between the lines. Step 806 positions the lens so that the imaging device is located outside the object space focal plane and the target pattern located outside the image space focal plane. Step 808 uses the imaging device to view the target pattern. In Step 810 the imaging device receives a viewed image representation of the target pattern. Step 812 compares the viewed image representation to the target pattern. More typically, the viewed image representation is compared to a target pattern copy.

For example. Step 812a may record the viewed image representation, and Step 812b subtracts the target pattern copy from the recorded image representation. More explicitly, Step 812b may create a subtracted pattern. Assuming the pattern is made from a set of lines, Step 812c measures the surface area in the subtracted pattern of a region, where the region is either lines or the spaces between lines. Step 812d compares the measured surface area with a maximum threshold. Note: this same method of analysis can be used for patterns other than grids or lines.

Alternatively, Step 812e adds the target pattern copy to the recorded image representation, creating a summed pattern. Again assuming a grid or line pattern, Step 812f measures the surface area in the summed pattern of a region, where the region is either (opaque) lines or (transparent or light) spaces. Step 812g compares the measured surface area with a maximum threshold. Again, this same method of analysis can be used for patterns other than grids or lines.

As noted above in the discussion of FIGS. 7A through 7D, comparing the viewed image representation to the target pattern in Step 812 may include comparing a geometric feature in the target pattern to a predetermined modified geometric feature in the viewed image representation. For example, a third order curve in the target pattern may be to a straight line in the viewed image representation, or a third order curve in the viewed image representation may be compared to a straight line in the target pattern.

In another aspect, comparing the viewed image representation to the target pattern in Step 812 includes measuring the total intensity of light accepted by the imaging device. Alternatively, Step 812 may compare chromatic offsets in the viewed image representation to the target pattern.

In another aspect, providing the lens in Step 802 includes providing a fiber optic cable connector lens body (e.g., see FIG. 3). In a related aspect, the fiber optic cable connector lens body may include a plurality of lens, each having a first and second surface. Such a device is described in parent application Ser. No. 12/900,401, see FIGS. 7A and 7B, which is incorporated herein by reference. Then, comparing the viewed image representation to the target pattern in Step 812 includes sequentially comparing the viewed image representation associated with each lens to the target pattern.

In another variation, receiving the viewed image representation of the target pattern in the imaging device (Step 810) includes receiving the viewed image representation of the target pattern in an imaging device having an optical transformation means. Then, comparing the viewed image representation to the target pattern in Step 812 includes comparing the target pattern to a viewed image representation modified to account for the imaging device optical transformation.

A lens test fixture and associated test method have been provided. Some examples of particular lens types, patterns, and process steps have been given to illustrate the invention. However, the invention is not limited to merely these examples. Other variations and embodiments of the invention will occur to those skilled in the art.

We claim:

1. An optical lens test fixture comprising:
   a lens clamping mechanism to locate a lens in a test position, the lens including a first lens surface with a focal plane in object space and a second lens surface with a focal plane in image space;
   a target pattern located outside the image space focal plane;
   an imaging device located outside the object space focal plane, to accept a viewed image representation of the target pattern; and
   a calculation module comparing the viewed image representation to a copy of the target pattern stored in a memory.

2. The test fixture of claim 1 wherein the imaging device is selected from a group consisting of a magnification instrument and a camera.

3. The test fixture of claim 1 wherein the calculation module records the viewed image representation and subtracts the target pattern copy from the viewed image representation.

4. The test fixture of claim 1 wherein the calculation module records the viewed image representation and subtracts the target pattern copy from the viewed image representation, creating a subtracted pattern, the calculation module measuring the surface area in the subtraction pattern of a region selected from a group consisting of opaque lines and transparent spaces between lines, and comparing the measured surface area with a maximum threshold.

5. The test fixture of claim 1 wherein the calculation module records the viewed image representation and adds the target pattern copy to the viewed image representation, creating an addition pattern, the calculation module measuring the surface area in the addition pattern of a region selected from a group consisting of opaque lines and transparent spaces, and comparing the measured surface area with a maximum threshold.

6. The test fixture of claim 1 wherein the target pattern is a grid pattern of opaque lines and spaces between the lines.

7. The test fixture of claim 1 wherein the calculation, module compares a geometric feature in the target pattern copy to a predetermined modified geometric feature in the viewed image representation.

8. The test fixture of claim 7 wherein the calculation module compares a third order curve in the target pattern copy to a straight line in the viewed image representation.

9. The test fixture of claim 1 further comprising:
the calculation module having an interface to accept the viewed image representation and measuring intensity of the viewed image representation.

10. The test fixture of claim 1 wherein the calculation module compares chromatic offsets in the viewed image representation to the target pattern copy.

11. The test fixture of claim 1 wherein the imaging device includes an optical transformation means and supplies a viewed image representation processed by the optical transformation means: and,
wherein the calculation module compares the target pattern copy, modified to account for the imaging device optical transformation, to the processed viewed image representation.

12. A pattern method for testing an optical lens, the method comprising:
providing a lens including a first lens surface with a focal plane in object space and a second lens surface with a focal plane in image space;
providing a pattern test fixture including an imaging device and a target pattern, wherein the target pattern comprises a predetermined geometric feature, the predetermined geometric feature based at least in part on an optical characteristic of the lens;
positioning the lens so that the imaging device is located outside the object space focal plane and the target pattern located outside the image space focal plane;
using the imaging device to view the target pattern;
receiving a viewed image representation of the target pattern in the imaging device; and,
comparing the viewed image representation to the target pattern.

13. The method of claim 12 wherein the imaging device is selected from a group consisting of a magnification instrument and a camera.

14. The method of claim 12 wherein comparing the viewed image representation to the target pattern includes comparing the viewed image representation to a target pattern copy.

15. The method of claim 14 wherein comparing the viewed image representation to the target pattern copy includes:
recording the viewed image representation; and,
subtracting the target pattern copy from the recorded image representation.

16. The method of claim 14 wherein comparing the viewed image representation to the target pattern copy includes:
recording the viewed image representation;
subtracting the target pattern copy from the recorded image representation, creating a subtracted pattern;
measuring the surface area in the subtracted pattern of a region selected from a group consisting of lines and spaces between lines; and,
comparing the measured surface area with a maximum threshold.

17. The method of claim 14 wherein comparing the image pattern to the target pattern copy includes:
recording the viewed image representation;
adding the target pattern copy to the recorded image representation, creating a summed pattern;
measuring the surface area in the summed pattern of a region selected from a group consisting of opaque lines and transparent spaces; and,
comparing the measured surface area with a maximum threshold.

18. The method of claim 12 wherein providing the target pattern includes providing a grid pattern of lines and spaces between the lines.

19. The method of claim 12 wherein comparing the viewed image representation to the target pattern includes comparing the predetermined geometric feature in the target pattern to a modified geometric feature in the viewed image representation.

20. The method of claim 19 wherein comparing the geometric feature in the target pattern to the modified geometric feature in the viewed image representation includes comparing a third order curve in the target pattern to a straight line in the viewed image representation.

21. The method of claim 12 wherein comparing the viewed image representation to the target pattern includes measuring the total intensity of light accepted by the imaging device.

22. The method of claim 12 wherein providing the lens includes providing a fiber optic cable connector lens body.

23. The method of claim 22 wherein providing the fiber optic cable connector lens body includes providing the lens body with a plurality of lens, each having a first and second surface; and,
wherein comparing the viewed image representation to the target pattern includes sequentially comparing the viewed image representation associated with each lens to the target pattern.

24. The method of claim 12 wherein comparing the viewed image representation to the target pattern includes comparing chromatic offsets in the viewed image representation to the target pattern.

25. The method of claim 12 wherein receiving the viewed image representation of the target pattern in the imaging device includes receiving the viewed image representation of the target pattern in an imaging device having an optical transformation means; and,
wherein comparing the viewed image representation to the target pattern includes comparing the target pattern to a viewed image representation modified to account for the imaging device optical transformation.

* * * * *